United States Patent

Ohm et al.

[11] Patent Number: 6,002,234
[45] Date of Patent: Dec. 14, 1999

[54] SYSTEM AND METHOD FOR CONTROLLING BRUSHLESS PERMANENT MAGNET MOTORS

[75] Inventors: Dal Y. Ohm, Blacksburg, Va.; Vankatesh B. Chava, Germantown, Md.

[73] Assignee: Kollmorgen Corporation, Waltham, Mass.

[21] Appl. No.: 09/037,263

[22] Filed: Mar. 9, 1998

Related U.S. Application Data

[63] Continuation-in-part of application No. 08/645,380, May 13, 1996, abandoned, which is a continuation-in-part of application No. 08/461,265, Jun. 5, 1995, abandoned.

[51] Int. Cl.$^6$ ...................................................... H02P 1/24
[52] U.S. Cl. .......................... 318/729; 318/809; 318/438
[58] Field of Search .......................... 318/700, 716–723, 318/729, 801–811, 437, 438

[56] References Cited

U.S. PATENT DOCUMENTS

| | | | |
|---|---|---|---|
| 4,546,293 | 10/1985 | Peterson et al. | 318/254 |
| 4,649,331 | 3/1987 | Jahns | 318/798 |
| 4,651,068 | 3/1987 | Meshkat-Razavi | 318/254 |
| 4,814,677 | 3/1989 | Plunkett | 318/254 |
| 5,038,092 | 8/1991 | Asano et al. | 318/811 |
| 5,097,189 | 3/1992 | Ito et al. | 318/685 |
| 5,583,411 | 12/1996 | Kusano et al. | 318/719 |

*Primary Examiner*—Brian Sircus
*Attorney, Agent, or Firm*—Morgan & Finnegan

[57] ABSTRACT

A system and method of calculating optimum angle advance for brushless permanent magnet motors. The calculations are based on the motor and drive parameters, and on operational variables including the motor speed and the motor load. The angle advance is calculated dynamically as a function of motor speed and where reluctance torque is involved, as a function of load current as well. For a given motor, the advance is calculated according to the speed and load together with the motor and drive parameters according to one or more angle advance equations.

18 Claims, 8 Drawing Sheets

ω (SPEED IN RPM)
(MAGNITUDE BOOST)

SYSTEM AND METHOD FOR CONTROLLING BRUSHLESS PERMANENT MAGNET MOTORS

CROSS-REFERENCE TO RELATED APPLICATION

This is a continuation-in-part of application Ser. No. 08/645,380 filed May 13, 1996, now abandoned, which is a continuation-in-part of application Ser. No. 08/461,265 filed Jun. 5, 1995 now abandoned.

FIELD OF THE INVENTION

This invention relates to electric motors, and more particularly to control systems for brushless permanent magnet motors.

BACKGROUND OF THE INVENTION

A brushless permanent magnet motor typically includes windings on the stator, rotating permanent magnets, and a position sensor for indicating the rotor position. The winding energization is generally controlled by solid state switches that are responsive to the position indications to energize the windings in the proper commutated sequence. Control of motor torque is achieved by controlling the magnitude of the winding excitation current.

U.S. Pat. No. 4,447,771 to Whited, entitled "Control System for Synchronous Brushless Motors" (the '771 patent), and U.S. Pat. No. 4,546,293 to Peterson et al., entitled, "Motor Control for a Brushless DC Motor", both describe a system in which both the phase and magnitude of a motor's winding excitation currents are controlled. A quadrature phase relationship normally exists between the rotor field and the rotating stator magnetic field. The phase angle is varied from the quadrature relationship to compensate for the fundamental current lag, which is a predetermined function of the motor speed. By dynamically varying the phase angle an improved motor performance is achieved over a wider speed range.

In addition, U.S. Pat. No. 4,651,068 to Meshikat-Razavi discloses a brushless motor drive circuit that utilizes current shaping in addition to a phase advancing technique as a function of motor velocity. The waveform compensation is especially effective in motors with trapezoidal magnetic field distribution.

In a manner similar to the '771 patent, U.S. Pat. No. 4,490,661 to Brown et al., entitled "Control System for Synchronous Brushless Motors Utilizing Torque Angle Control" (the '661 patent), employs "torque angle factors" to vary the phase relationship between the rotor field and the rotating stator magnetic field as a function of the motor load, in addition to the phase advance as a function of the speed.

This patent may be applicable to motors where the inductance value of the stator is a function of the rotor angle, typically notable when rotor magnets are buried inside the rotor. For these types of motors, U.S. Pat. No. 4,649,331 to Jahns teaches us how to operate the motor at a high speed, constant power range by automatically following the voltage limit ellipse.

Although the fundamental principles of phase advancing techniques are revealed in the previous patents, a method to obtain the optimal phase advance values is highly nonlinear and usually requires torque plot at various phase advance angles at each operating condition (speed and torque).

The typical calibration procedure for arriving at the torque angle factors used in determining the angle advance in the '771, '661 and other patents would use a test motor and drive and a dynamometer with torque and speed sensor. First, the motor is started to run with a load so that its temperature reaches its predetermined temperature. Once stable speed and temperature were achieved the angle advance is manually adjusted while observing the dynamometer reading to determine the angle that gives the maximum torque. The calibration procedure was repeated for the desired number of motor speeds and/or loads to create a table of torque angle factors. The calibration procedure would be repeated for each motor type, and in some cases, for each motor. This prior calibration method was costly and time consuming and provided torque angle values for only a finite number of motor speeds.

An object of the present invention is to provide a formula to calculate the amount of speed and load angle advances based on motor and drive parameters.

Another object of this invention is to provide a command boost technique to further increase the torque from the motor. Although many prior patents, as mentioned above, dealt with speed and load advance angles, they all exhibit magnitude reduction of the actual torque at high speeds. The magnitude boost can also be calculated from the motor parameters to improve high speed torque when operated with the torque mode.

SUMMARY OF THE INVENTION

The present invention provides a system and method for determining the best angle advance and the amount of magnitude boost for any set of motor speed and/or load conditions, without engaging in a lengthy calibration procedure. The calculations are based on certain motor and drive parameters. The motor parameters include the number of poles P, the back emf Kv, and the stator inductance values Ld and Lq. The drive parameters include the bandwidth of the PWM (pulse width modulation) amplifier $\omega_{bo}$, the control loop time delay $\Delta t$ and the available link supply voltage Vm. These motor and drive parameters can be used according to the invention to determine the optimum phase advance and magnitude boost for the dynamic variables of rotor speed $\omega$ and stator current Is. The angle advance and boost values calculated from the motor parameters and drive parameters can be recorded in a look-up table as functions of the dynamic factors of rotor speed and/or motor load.

In one implementation of the preferred embodiment, discrete logic or a microprocessor is used to compute the angle advance and control the winding excitation currents accordingly. In the microprocessor implementation, a program stored for use in the microprocessor is used to calculate the angle advance. The calculations are based on: a rotor position feedback signal supplied by one or more sensors, a rotor velocity feedback signal which can be derived from the position feedback signal, and a measure of stator current which is proportional to torque. The microprocessor computes the optimum angle advance and the amount of magnitude boost for any combination of speed, rotor position, and torque.

DETAILED DESCRIPTION

Figure 1:
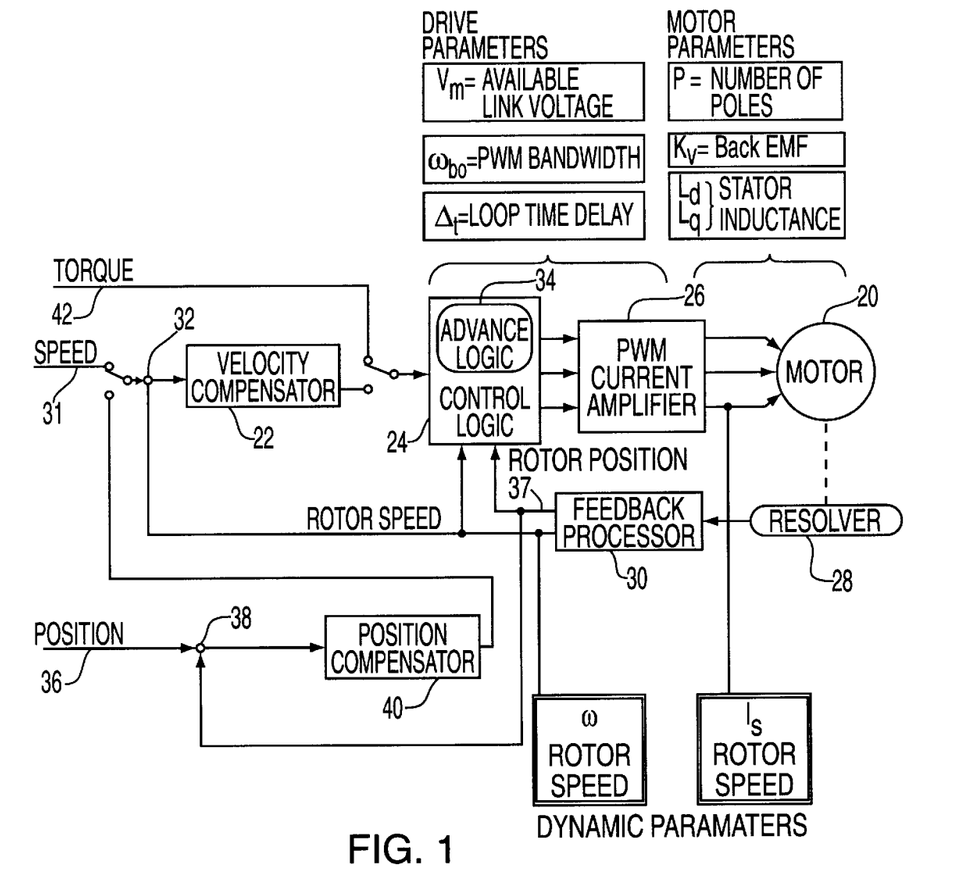
FIG. 1 is a functional block diagram of a motor control system in accordance with the present invention.

A functional block diagram of a permanent magnet motor control system in accordance with the present invention is shown in FIG. 1. The system is used to control a three phase motor 20. The basic elements for velocity control are: a velocity compensator 22, a control logic unit 24, a PWM current amplifier 26, a resolver 28, and a feedback processor 30. The elements form a control loop which upon receiving a velocity command, compares the commanded values with the actual feedback values and adjusts the motor excitation accordingly.

When operating as a velocity servo system, the speed command 31 is supplied to a summing junction 32 where it is compared with the actual rotor speed feedback derived from resolver 28 coupled to the shaft of motor 20 and feedback processor 30. The summing junction produces an error signal corresponding to the difference between the velocity command and the velocity feedback. The error signal after passing through velocity compensator 22 provides the torque command to the control logic unit 24. The control logic and the PWM current amplifier supply an excitation current to the motor related in amplitude to the magnitude of the torque command. In the velocity servo operation the excitation current to the motor is adjusted to minimize the error signal at the summing junction so that the motor speed corresponds to the speed command.

Feedback processor 30 coupled to the resolver provides a rotor position indication and a rotor speed indication to control logic unit 24. The rotor speed indication is used to generate motor excitation currents having a frequency synchronous with the speed of rotation. The rotor position indication is used as a reference for setting the phase of the excitation current corresponding to the angle advance determined by an advance logic unit 34 within the control logic unit.

In the position servo mode, a position command 36 and actual rotor position 37 is supplied to the summing junction 38 and a position compensator 40 to provide a velocity command signal to the velocity summing junction 32.

Position and velocity servo are the most common feedback control modes. However, a torque mode is possible by applying torque command 42 directly to control logic 24.

Figure 2:
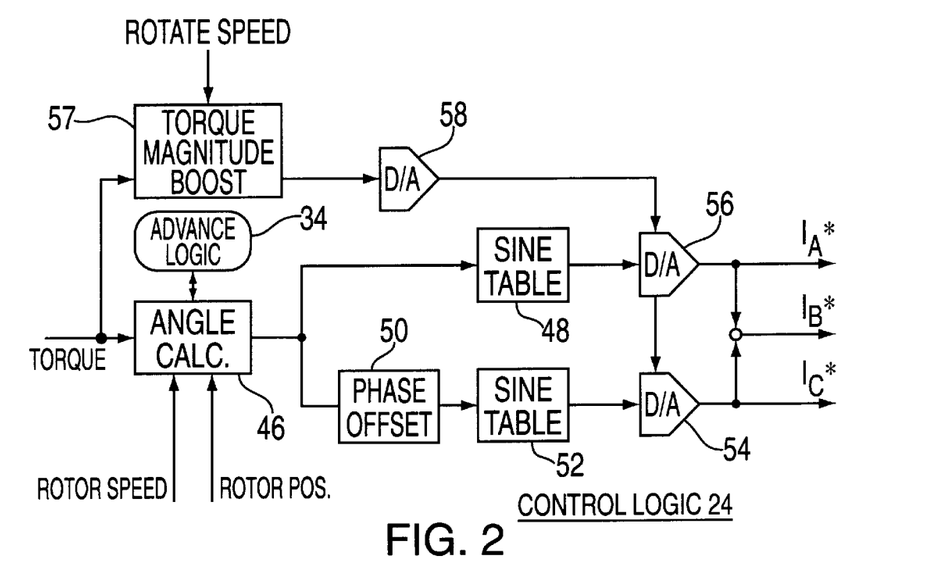
FIG. 2 is functional block diagram of a control logic unit suitable for use in the motor control system of FIG. 1.

A more detailed block diagram of the control logic unit is provided in FIG. 2. An angle calculation unit 46 receives the rotor position and rotor speed indications from the feedback processor in addition to the torque input from the velocity compensator. An advance logic unit 34 calculates the appropriate angle advance based on torque and speed. The angle advance calculations are described in detail hereinafter. Angle calculation unit 46 produces a current vector angle for the "A" phase which is the rotor magnet position added by the angle advance and 90 degrees electrical. The current vector angle is supplied to a sine look-up table 48 which provides a digital sine value corresponding to the phase vector position. The phase vector is also supplied to a sine look-up table 52 via a phase offset unit 50 which shifts the phase vector by 120 electrical degrees. The output of sine table 48 passes through a multiplying digital to analog converter 56 to produce the phase A sine wave. The output of sine table 52 similarly passes through a multiplying digital to analog converter 54 to produce the phase C sine wave. Since the phase sine waves are each displaced by 120 electrical degrees, the phase B sine wave is derived as the negative sum of phases A and C. The torque command boost passes through torque magnitude boost logic 57, and then passes through a digital to analog converter 58 to supply the multiplier to multiplying DACs 54 and 56. Detailed function of torque boost will also be described later. Thus, the control logic produces a three phase signal having a phase according to the angle advance relative to the rotor position and an amplitude corresponding to the needed torque.

Figure 3:
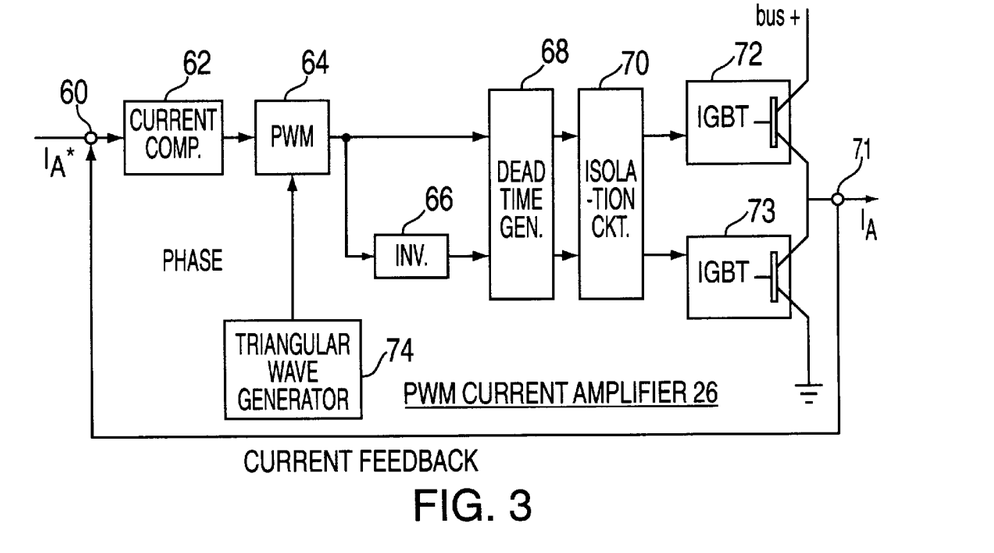
FIG. 3 is a schematic diagram of a PWM current amplifier suitable for use in the motor control system of FIG. 1.
Figure 4A:
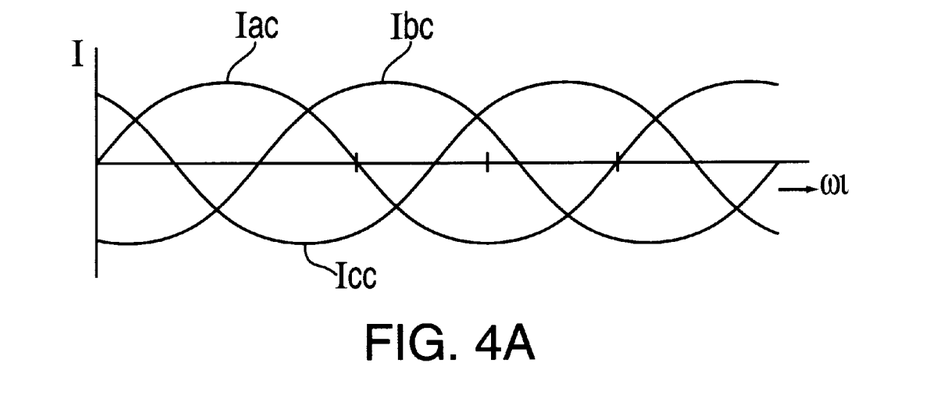
FIG. 4 is an illustration of the relationship between the sinusoidally varying excitation signals and the and the corresponding pulse width modulated (pwm) outputs of the amplifier of FIG. 3.
Figure 4B:
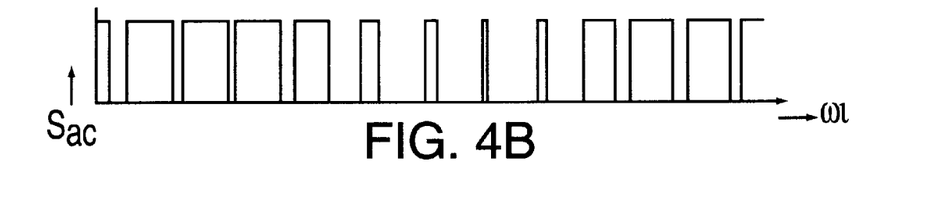
Figure 4C:
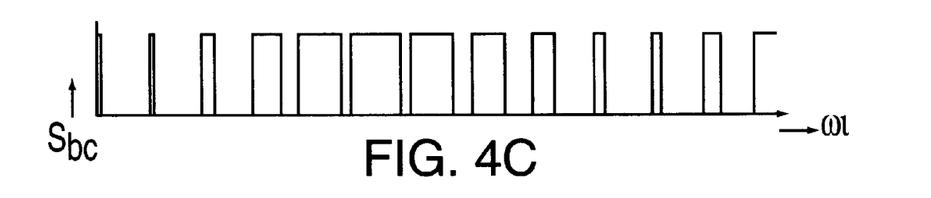
Figure 4D:
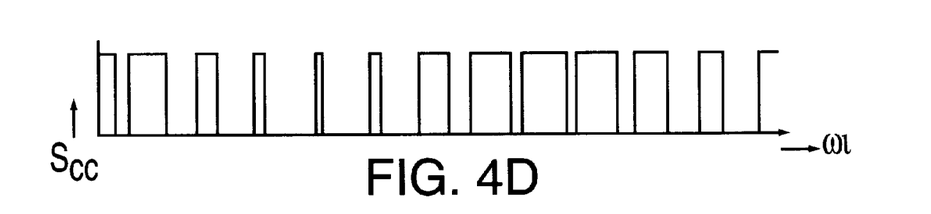

FIG. 3 is a block diagram of the current amplifier 26 for phase A. Similar current amplifiers are used for phases B and C. The sinusoidal phase A command ($I_A^*$) signal from D/A converter 56 (FIG. 2) is supplied to the input of current amplifier 26 to produce the current for exciting the phase A winding of motor 20 (FIG. 1). The current for exciting the motor winding is in the form of current pulses each having a pulse width corresponding to the amplitude of the input signal.

The phase A command ($I_A^*$) signal is supplied to summing junction 60 where it is compared to the current feedback from the amplifier output. The feedback can be obtained using any suitable current sensor 71 which returns a signal whose voltage is proportional to the stator current. Summing junction 60 produces an error signal proportional to the difference between the input signal and the feedback. The error signal is amplified to produce a motor current determined by the magnitude of the input signal.

The error signal from summing junction 60 passes through a current compensation circuit 62 to a PWM (pulse width modulator) 64. The input signal to the PWM is compared to a triangular wave from a generator 74 such that the output pulse becomes wider as the signal magnitude becomes greater.

Current to phase A of the motor winding is supplied by a pair of IGBT power transistors 72 and 73. The upper transistor 72 is connected to the positive bus and the lower transistor 73 is connected to ground. The common connection between the transistors is connected to phase A of the motor winding. When upper transistor 71 is conductive, the winding is connected to the positive bus. When the lower transistor 73 is conductive, the winding is connected to ground. The output of the PWM 64 directly drives the upper transistor 72 via a dead time generator 68 and an isolation circuit 70. The output of the PWM also passes through an inverter 66 and then drives lower transistor 73 via dead time generator 68 and isolation circuit 70. The isolation circuit is preferably an optical coupling which isolates the power stages from the sensitive electronic control circuits. Dead time generator 68 provides a minimum time interval between the turn-off of one power transistor and the turn-on of the other so there is no short circuit from the positive bus to ground through the transistors.

Pulse width modulator 64 includes a comparator which compares the sinusoidal input to the triangular wave from generator 74. If the sinusoid value exceeds that of the triangular wave, the output of the comparator is positive and transistor 72 is turned on. If the sinusoid value is less than that of the triangular wave, the output of the comparator is zero and transistor 73 is turned on. The effect of this comparator operation is to produce square pulses of varying width. FIG. 4 illustrates the relationship between the three phase pulse width modulated signals (Graphs B, C and D) and the sinusoidal input signals (Graph A).

Figure 5:
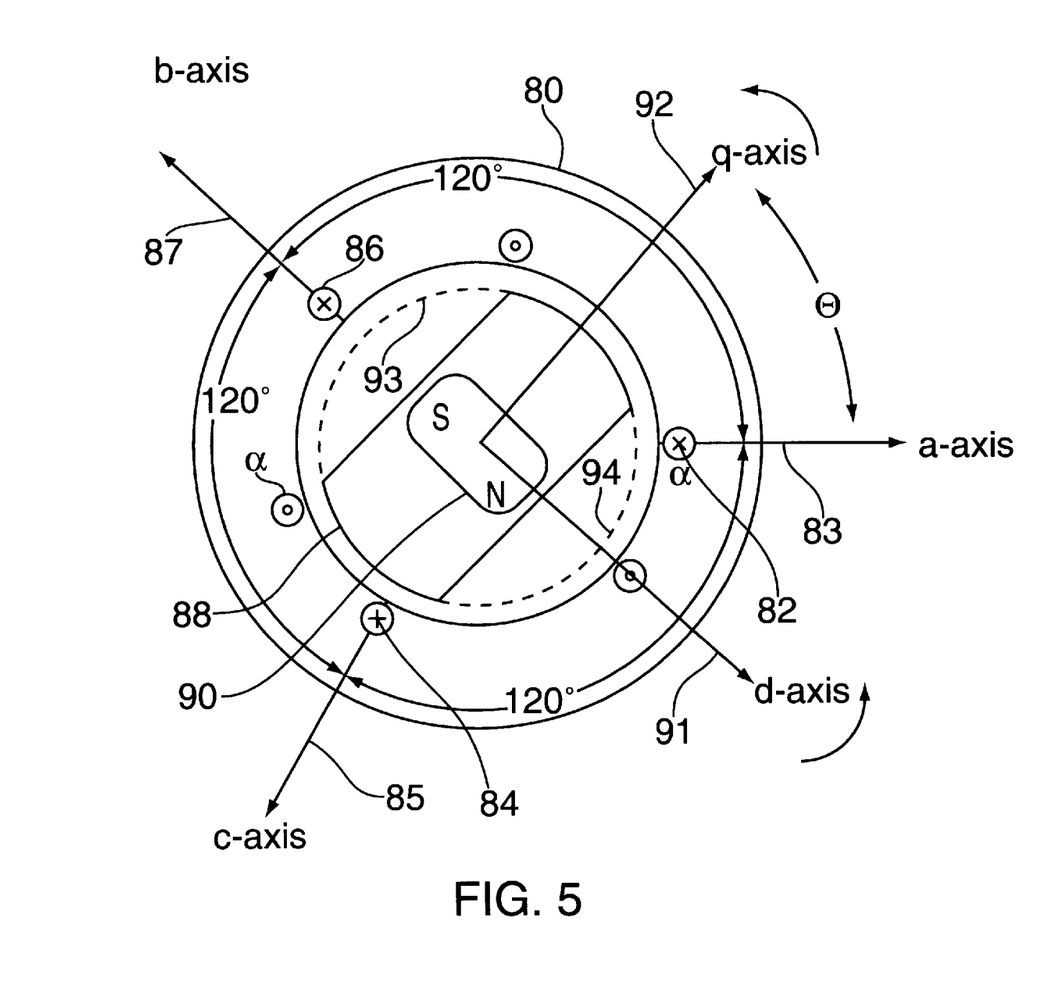
FIG. 5 is a cross section of a brushless permanent magnet motor wherein the magnets are embedded in the rotor.

A conceptual representation of a motor controllable by the system is shown in FIG. 5. This conceptual representation is used in deriving the equations for calculating the angular advance in advance logic 34 and torque boost logic 57 (FIG. 1). The motor includes: a stator 80 having three windings 82, 84 and 86; and a rotor 88 having an imbedded permanent magnet 90. As can be seen from the figure, windings 82, 84 and 86 are symmetrically oriented around the stator, each displaced 120° from one another. Each stator winding is modeled as a one turn concentrated winding. For example, the one turn representing winding 82 starts at position a and returns at position a', which is located at a point 180° from position a.

The conceptual motor of FIG. 5 is an Interior Permanent Magnet (IPM) type motor. That is, the motor has permanent magnets located in the core of the rotor rather than at the rotor surface. The salient rotor structure of the IPM motor results in a winding inductance which varies as a function of the rotor angle. The IPM motor stands in contrast to Surface Permanent Magnet (SPM) motors which have their permanent magnets located on the surface of the rotor. FIG. 5 may be used as a conceptual representation of an SPM motor if the shape of the rotor is redrawn as a circle (as illustrated by dotted lines 93 and 94). Both IPM and SPM type motors can be operated more efficiently by employing angle advance. As will be described later in more detail, the optimum angle advance for an SPM motor is primarily a function of the motor speed, while for an IPM motor it is a function of both motor speed and load.

The motor of FIG. 5 is preferably operated by exciting the windings with three phase sinusoidal power, one electrical phase for each winding. Since the peaks of the sinusoidal excitation occur at intervals of 120° relative to each other, and thus correspond to the spatial orientation of the windings, a "rotating" magnetic field is created by the winding excitation. The flux of the rotating magnetic field interacts with the flux of the rotor's permanent magnet, causing the rotor to turn in synchronism with the rotating field. The solid state control of current flow through the windings according to rotor position is commonly known as electrical commutation, a process which allows brushless permanent magnet motors to operate without the troublesome commutation brushes found in many prior electric motors.

The dynamic angle advance control performed by the advance logic unit 34 (FIGS. 1 and 2) is based on equations as set forth below.

FIG. 5 illustrates a conceptual cross-sectional view of a 3-phase, 2-pole IPM motor along with chosen reference frames. The stator reference axis for "a-phase" (axis 83) is chosen as the direction of maximum mmf when a positive a-phase current is supplied. Reference axis for the other stator axes (axes 85 and 87) are chosen accordingly. Following the d-q model convention, the direction of permanent magnet flux is chosen as the d-axis (axis 91), while the q-axis (axis 92) is 90° ahead of the d-axis. The concept of the d-q model of a brushless motor is similar to that of the previous patents, U.S. Pat. Nos. 4,814,677 (Plunkett) and 5,038,092 (Asano et al.). The angle of the q-axis with respect to the a-axis is defined as θ. As the machine turns, the d- and q- reference frame is rotating at a speed of ω=dθ/dt, while the stator a, b and c axes are fixed in space. Nomenclature for the description is as follows:

| | |
|---|---|
| P | number of poles of the motor |
| Ia, Ib, Ic | phase a, b, c instantaneous stator current |
| Va, Vb, Vc | phase a, b, c instantaneous stator voltage |
| Id, Iq | d and q axis components of stator current |
| Vd, Vq | d and q axis components of stator phase voltage |
| Is | magnitude of stator current vector |
| | Note: Is = sqrt(Id$^2$ + Iq$^2$) |
| Vs | magnitude of stator voltage vector |
| | Note: Vs = sqrt(Vd$^2$ + Vq$^2$) |
| Rs | stator resistance |
| p | d/dt |
| Ld, Lq | d and q axis stator self inductance |
| ψmag | peak flux linkage due to permanent magnet |
| θ | (electrical) angle between a-axis and q-axis |
| ω | ω = pθ, angular velocity of rotation (in electrical rad/sec.) |
| Ls | constant component of air gap reluctance |
| | Note: Ls = Lso + Lsl, where Lso is the inductance that produces torque and Lsl is the stator leakage inductance |
| Lx | magnitude of sinusoidally varying component of air gap reluctance |

By letting S represent the quantity (current, voltage, and flux linkage) to be transformed from the abc frame to the d-q frame the following matrix transformation is derived.

$$\begin{bmatrix} Sq \\ Sd \\ So \end{bmatrix} = (2/3) \begin{bmatrix} \cos\theta & \cos(\theta-120) & \cos(\theta+120) \\ \sin\theta & \sin(\theta-120) & \sin(\theta+120) \\ 0.5 & 0.5 & 0.5 \end{bmatrix} \begin{bmatrix} Sa \\ Sb \\ Sc \end{bmatrix} \quad (1)$$

In a balanced 3 phase system the So component, or "zero sequence component" is always zero.

Since the transformation is linear, its inverse transformation exists and is given by:

$$\begin{bmatrix} Sa \\ Sb \\ Sc \end{bmatrix} = \begin{bmatrix} \cos\theta & \cos\theta & \cos(\theta+120) & 1 \\ \cos(\theta-120) & \sin(\theta-120) & \sin(\theta+120) & 1 \\ \cos(\theta+120) & \sin(\theta+120) & 0.5 & 1 \end{bmatrix} \begin{bmatrix} Sq \\ Sd \\ So \end{bmatrix} \quad (2)$$

In terms of synchronous frame, dynamic models of PM synchronous machines are as follows:

$$Vq = (Rs + Lqp)Iq + \omega Ld\,Id + \omega\psi mag \quad (3)$$

$$Vd = (Rs + Ldp)Id - \omega Lq\,Iq \quad (4)$$

In the above equations Lq and Ld are called q-axis and d-axis inductance respectively.

Figure 6A:
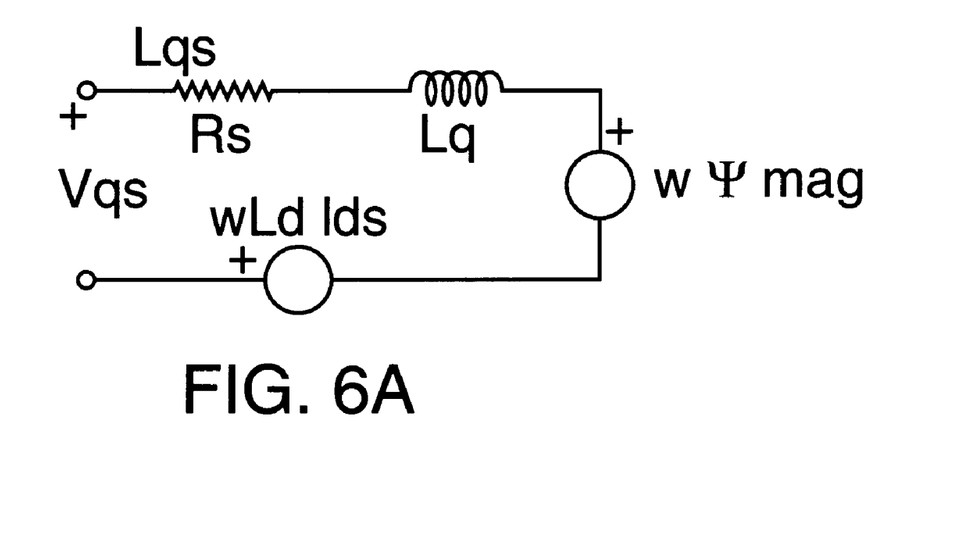
FIG. 6A shows the q-axis dynamic equivalent circuit for an IPM motor.
Figure 6B:
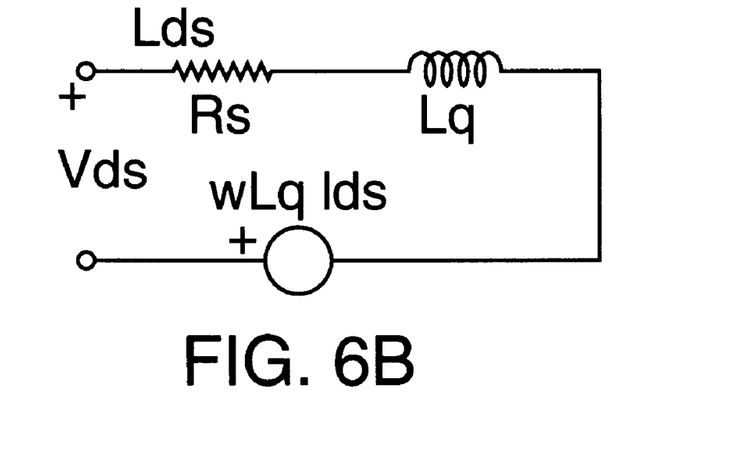
FIG. 6B shows the d-axis dynamic equivalent circuit for an IPM motor.

Equations (3) and (4) form the basis for the d-q model for brushless permanent magnet motors. The d-q equivalent circuit that represents the model is shown in FIGS. 6A and 6B.

The produced torque T of this model can be expressed as:

$$T = (3/2)(P/2)(\psi mag\ Iq + (Ld-Lq)Iq\ Id). \quad (5)$$

According to (5) produced torque is proportional to Iq when Lq=Ld. This is normal operating condition at low speed. In terms of angle relation, this means that if rotor d-axis (magnetic axis) position is detected, current phase angle should be 90° (electrically) ahead of it. The method used in the patented system adds speed advance and load advance as follows. When rotor angle (d-axis angle in stationary frame) is detected as rotor position θr, stator current phase angle is calculated by $$\theta sa = \theta r \pm (90 + \theta i) + \theta s \quad (6)$$

where θi represents the load angle advance, which is a function of the stator load current (Is), which is, in turn, a function of Tc. θs represents the speed angle advance, which is a function of ω.

For each type of advance, an equation which describes the advance in terms of motor parameters is derived below. The derivations are based on the d-q axis motor model described above.

1) Load Angle Advance

When the load angle advance is discussed, assume that the current amplifier is ideal and θs=0. Thus θi is equal to θ of FIG. 1, the angle between the q-axis and a-axis. Accordingly, Id and Iq can be expressed as:

$$Iq = Is \cos \Theta i, \quad Id = Is \sin \Theta i \quad (7)$$

The above equations may be substituted into equation (5) to yield the following expression for produced torque.

$$T = (3/2)(P/2)(\psi mag\ Is \cos \Theta i + (1/2)(Lq - Ld)Is^2 \sin 2\Theta i) \quad (8)$$

As can be seen from equation (8), the produced torque (T) is dependent not only on the stator current, but also on the current angle θi. Thus the produced torque may be controlled by varying the stator current, by varying the current angle, or by varying both. A particularly useful motor control strategy is to adjust the motor so that maximum torque is produced for a given stator current.

For surface permanent magnet (SPM) motors whose inductance is constant regardless of rotor angle, the second term in equation (8), which represents reluctance torque, vanishes and equation (8) may be expressed as:

$$T = (3/2)(P/2)\psi mag\ Is \cos \Theta i \quad (9)$$

For SPM motors with orthogonal control, the optimal load angle advance θi is simply zero. For IPM motors, Lq=Ld=Ls may not hold. Therefore the second term of equation (8) does not drop out, and it can be seen from the equation that orthogonal control does not produce maximum torque per current in IPM motor.

The θi which produces maximum T for a given Is may then be determined by differentiating the right side of equation (8) and setting the derivative equal to zero. This results in the following expression for θi.

$$\theta i = \sin^{-1}\left( \frac{-\Psi mag}{4(Lq - Ld)Is} + \sqrt{\left(\frac{\Psi mag}{4(Lq - Ld)Is}\right)^2 + \frac{1}{2}} \right) \quad (10)$$

As shown in equation (10) the optimal load angle advance may be computed from a knowledge of motor parameters Ld, Lq and ψmag (which can be in turn calculated from Kv and P), and a knowledge of the magnitude of the stator current, Is. Such a computation may be made from the parameters while the motor is in operation. As an alternative, a look-up table of Θi vs Is may be computed during the motor initialization process so that the load angle advance for a given stator current can be obtained by reading the look-up table.

2) Speed Angle Advance

For a given load angle advance θi, in order to make the motor produce desired maximum torque, the following assumptions must hold.

1. The signal processing performed by the sensor, feedback processor, and control logic unit of FIG. 2 is instantaneous.
2. The sinusoidally varying signals are amplified by the current amplifier of FIG. 2 without any phase delay.

If the above two conditions are met, or the combined delays are negligible, the produced torque would be as expected. However, in most practical drive systems, there are significant time delays in signal processing and phase delays in the current amplifier. Therefore, to find the optimal phase angle, not only the load angle advance, but also the above mentioned delays must be considered.

The time delay associated with the sensor, feedback processor, and control logic unit processing may be expressed as a phase delay. If the sum of these fixed time delays is represented by Δt, the phase delay due to the processing components (θs1) can be calculated as:

$$\theta_{s1} = (180/\pi)\Delta t \omega \quad (11)$$

The phase delay in the current amplifier (or "current controlled amplifier") can be modeled if the bandwidth $\omega_b$ of the current loop is known. The bandwidth of most current controlled PWM amplifiers is dependent on the supply voltage and motor back emf voltage. The bandwidth $\omega_b$ at speed ω can be calculated by: letting $\omega_{bo}$ be the current loop bandwidth of the drive at zero speed, nominal voltage supply; letting Vm be the available voltage (rms) for the inverter control at zero speed; and assuming that the stator resistance and power converter drops are already factored into the Vm calculation. The foregoing nomenclature yields the following equation for $\omega_b$.

$$\omega_b = \omega_{bo}(Vm - K\ Kv\ \omega(2/P))/Vm \quad (12)$$

With respect to the above equation, it should be noted that Kv is the back emf voltage constant in V/rad/sec, and that K is a small constant which accounts for magnetic saturation. K is preferably set by experiment and within the range of 0.1 to 0.2. It should also be noted with respect to equation B.10 that the effect of stator voltage drop has been neglected.

Another assumption made in computing the amplifier phase delay is that the most practical amplifier can be modeled as a first order amplifier of the form:

$$G(s) = \frac{Ka}{s/\omega_b + 1} \quad (13)$$

In the above equation Ka is the amplifier DC gain, which has no bearing on the phase delay calculation. Now, the phase lag due to the amplifier is given by $$\theta_{s2} = \arctan(\omega/\omega_b) \quad (14)$$

When the system is in generation mode, the sign of ω in equation B.10 is negative, and $\omega_b$ is higher than $\omega_{bo}$, resulting in a very small $\theta_{s2}$. Therefore, the speed angle advance required for generation mode is smaller than that required for motoring mode.

In accordance with equations (11) and (14) the desired speed angle advance may be written as:

$$\theta_s = \theta_{s1}\theta_{s2} = (180/\pi)\Delta t\omega + \arctan(\omega/\omega_b) \quad (15)$$

Thus, the speed angle advance may be calculated from a knowledge of Kv, $\omega_{bo}$, Vm, $\Delta t$ and $\omega$. Parameters Kv and $\omega_{bo}$ are associated with the motor, while parameters Vm and $\Delta t$ are parameters associated with the controller. As in the case of load angle advance, a look-up table array of optimal θs vs speed can be calculated upon motor initialization.

3) Implementation of Speed and Load Angle Advance

Figure 7A:
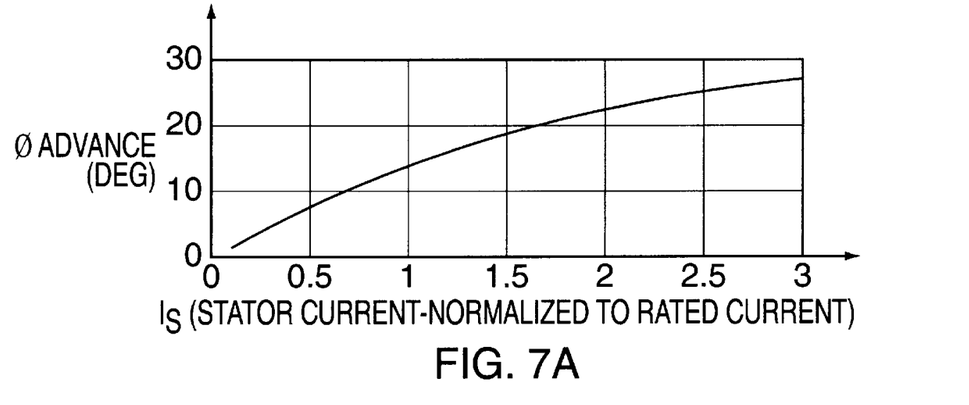
FIG. 7A is a graph depicting the load advance angle vs stator current as computed according to the present invention.
Figure 7B:
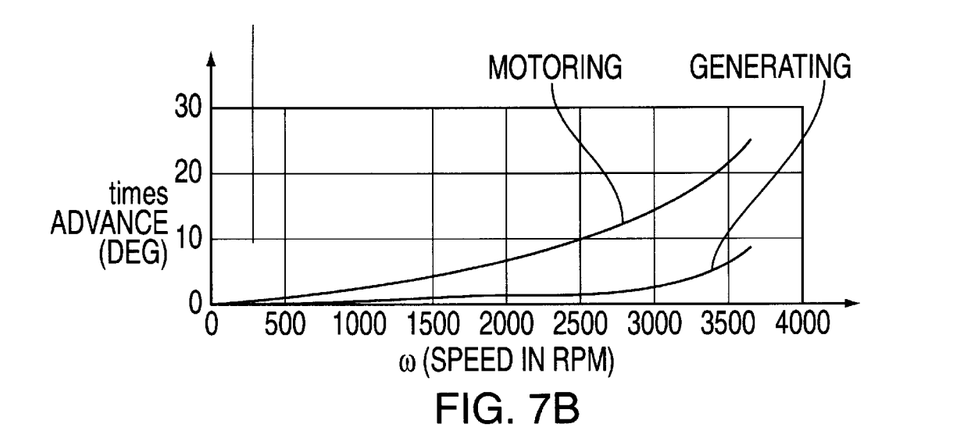
FIG. 7B is a graph depicting the speed advance angle vs motor speed as computed according to the present invention.

The load angle advance curve described by equation (10) is shown in FIG. 7A. The speed angle advance curves are shown in FIG. 7B. In accordance with the description of equation (15), FIG. 7B shows two speed angle advance curves, one for motoring mode, and one for generating mode.

The optimum angle advance for a given mode of operation, rotor speed, and stator current may be determined from inspection of FIGS. 7A and 7 B. The mode and speed may be used in conjunction with FIG. 7B to yield a value for the speed angle advance, while the current may be used in conjunction with FIG. 7A to yield a value for the load angle advance. The two values are then added to determine the optimum advance.

The curve for angle advance as a function of stator current shown in FIG. 7A is typical for an imbedded permanent magnet (IPM) motor. The comparable curve for a surface permanent magnet (SPM) motor is typically a flat zero curve, meaning that no angle advance correction as a function of stator current is required.

In the embodiment described above and depicted in FIGS. 1, 2 and 3 the angle advance may be computed dynamically by performing the calculations of equations (10) and (15). However, if the control logic unit does not have the capacity to compute the angle advance dynamically, a look up table may be employed. In such a configuration, the look up table contains a precalculated list of angle advances formulated from equations (10) and (15). Separate look up tables could be used for load advance, speed advance in generating mode, and speed advance in motoring mode. During motor operation the advance logic unit would use the tables to "look up" the angle advance corresponding to the present torque command value, rotor speed, and operating mode. The look up tables obviate the need to perform the complex calculations of equations (10) and (15) on an ongoing basis. The look-up table approach has the disadvantage of requiring considerable initial set up time.

Interpolation may be used in conjunction with one or more look up tables. Interpolation increases the efficiency of a look up table configuration by providing approximations of exact angle advance for operating conditions other than those specified in the table. The complexity of the interpolation algorithm employed may be varied to trade off accuracy of calculation and calculation speed.

In another embodiment, neither "on the fly" computation of equations (10) and (15), nor "look up" tables are employed. Instead equations (10) and (15) may be approximated through curve fitting based on a limited set of precalculated values. Curve fitting may yield equations that are simpler to calculate than equations (10) and (15), thus allowing them to be calculated "on the fly". As with interpolation, the complexity of the curve fitting equations may be varied to trade off between accuracy of calculation and calculation speed.

In another embodiment of the invention an integrated circuit processor, such as a microprocessor or digital signal processor is incorporated into control logic unit 24. To implement such a system: the torque command is converted to a digital signal prior to being passed to the processor. The functions of the angle calculation circuit 46, advance logic unit 34, phase offset 50, and sine tables 48 and 52 as shown in FIG. 2 are coded into the processor's software. The D/A converters 54 and 56 are located at a point between the microprocessor and the PWM current amplifier. The profile generator, position compensator, velocity compensator, feedback processor may also be functions performed in the microprocessor.

4) Torque Magnitude Command Boost

Figure 8:
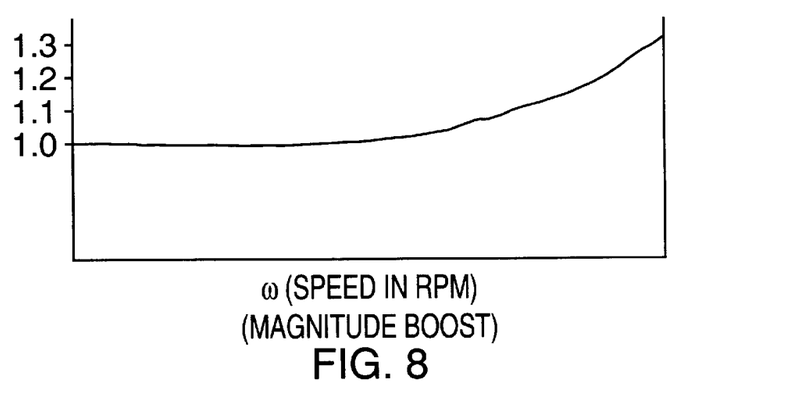
FIG. 8 is a graph depicting the magnitude boost as computed according to the present invention.

In some cases it is useful to compensate for stator current dropoff due to approaching saturation at high torque operation. The current dropoff refers to the reduction in motor current that occurs with incremental increases in motor speed. A technique that may be used to compensate for stator current dropoff is described below. The compensation technique is described in relation to the embodiment illustrated in FIGS. 1–3 and is illustrated graphically in FIG. 8.

Stator current dropoff is related to the current amplifier portion of the motor drive. As was discussed above, the amplifier can be modeled as a first order control system having the transfer function (13) rewritten as, $$G(s) = \frac{Ka}{s/\omega_b + 1} \quad (16)$$

where $\omega$ is the electrical frequency corresponding to the speed of the rotor, $\omega b$ is the bandwidth of the current-loop at speed $\omega$, and Ka is the amplifier DC gain. It follows that the magnitude, M, of the amplifier transfer function is:

$$M = \frac{Ka}{\sqrt{(\omega/\omega_b)^2 + 1}} \quad (17)$$

Thus, the magnitude of the amplifier output decreases as motor speed increases. The speed angle advance of equation (15) does not account for the magnitude dropoff associated with the current amplifier, but rather, accounts only for the phase delay associated with the amplifier. One way to compensate for the stator current dropoff is to add torque magnitude boost block 57 as shown in FIG. 2.

The magnitude boost unit compensates for the stator current dropoff by multiplying the torque command by the inverse of the amplifier transfer function magnitude (1/M). This has the effect of increasing the output of DAC 58 by 1/M, and, in turn, increasing the output of DACs 56 and 54 by 1/M. Accordingly, the currents phase A, phase B and phase C that are passed to the current amplifier are increased by a factor of 1/M, and the net result is that the stator current entering summing junction 60 in FIG. 4 is increased by a factor of 1/M. This increase compensates for the stator current dropoff.

5) Parameter Variation and Identification

As previously mentioned, equations (10) and (15) may be used to dynamically compute the angle advance. To solve these equations the following parameters indicated in FIG. 1 are required. The required motor parameters are Ld and Lq (stator inductances), P (the number of poles) and Kv (the back EMF constant). The required drive parameters are ωbo (the PWM bandpass), Δt (the loop time delay) and Vm (the available link voltage). The required dynamic parameters are ω (the rotor speed) and Is (the stator current). In an adaptive controller implementation, the required motor parameters and drive parameters are established during initialization of the system and then used in calculating the angle advance according to the dynamic parameters of rotor speed and stator current while in operation.

The dynamic parameter ω (rotor speed) may be measured using resolver 28, and the dynamic parameter Is (stator current) may be measured by a suitable current sensor located to measure current supplied to the motor.

Regarding Δt, in most applications the loop time delay Δt is negligible and therefore drops from the equations. Where required, the loop time delay can be measured by passing a test pulse through the system and measuring the delay during the initialization.

Regarding Vm, this parameter may be determined from the DC link voltage, Vdc. The relationship between Vm and Vdc is dependent on the method of modulation. For sinusoidal-triangle modulation, Vm=0.78 Vdc.

Regarding Kv, this parameter is generally available from the manufacturer's data sheet and may be entered manually during initialization, for example, through data key entry. Alternatively, Kv could be determined by driving the motor at a fixed speed, such as 20% of the nominal speed, and measuring the voltage generated under these conditions. When measuring the voltages, no angle advance should be used. Other methods for determining Kv from the instantaneous voltages are also well known.

Regarding ωbo, this parameter can be determined by locking the motor shaft and exciting the controller with a sinusoidal torque command. The sinusoidal input command is swept from approximately 1 Hz to 3 KHz while the output of the controller is measured. The bandwidth parameter ωbo is the frequency at which the magnitude of the measured output is 3 dB down from the steady-state, low frequency value.

At this point, the parameters required by the equation that remain to be determined are ψmag (peak flux linkage due to permanent magnet), and Ld and Lq (stator inductances). For each of these parameters, two methods of calculation are presented. In each case, the first method involves fewer steps than the second, but the second method provides a more precise determination of the parameter.

For a simplified determination of ψmag, the value of Kv may be inserted into the following equation to yield a value for ψmag.

$$\Psi mag = \sqrt{(2/3)}\,(2/P)Kv \tag{18}$$

For simplified determinations of the stator inductances Ld and Lq the following procedure may be employed. First, the stator resistance, Rs, is measured. This is done by applying a small amount of DC voltage, Vi, into the motor and measuring the resulting DC current, Ii. Rs is equal to Vi/Ii. Next, a three phase step current is injected into the q-axis at zero speed and the decay time, Trq, is measured. Once Rs and Trq are known, Lq may be calculated from the equation:

$$Lq = TrqRs \tag{19}$$

Similarly, a three phase step current may be injected into the d-axis at zero speed and the rise time, Trd, measured. Ld is then given by:

$$Ld = TrdRs \tag{20}$$

For more precise determinations of ψmag, Ld and Lq effects of magnetic saturation should be considered and the following equations may be used. Note that ψmag, Ld and Lq are all functions of load current represented by k.

$$Lq = Lqo(a+1)/(a+k) \tag{21}$$

$$Ld = Ldo(b+1)/(b+k) \tag{22}$$

$$\psi mag = \psi mago(c+1)/(c+k) \tag{23}$$

Where:

Lqo is the q-axis self inductance at rated stator current

Ldo is the d-axis self inductance at rated stator current

ψmago is the peak flux linkage at rated stator current a, b and c are constants determined by the saturation characteristics of the motor k=Is/Iso Iso is the rated stator current Is is the actual stator current To determine the value of constants a, b and c, Ld and Lq are each measured at two or more stator current values. Preferably Ld and Lq are measured at the rated stator current and at three times the rated stator current (k=3). If at the rated current, a value of Lqo is obtained for Lq, and at three times the rated current, a value of Lq1 is obtained for Lq, then a is given by:

$$a = (kLq1 - Lqo)/(Lqo - Lq1) \tag{24}$$

Similarly b will be given by:

$$b = (kLd1 - Ldo)/(Ldo - Ld1) \tag{25}$$

The value c=b, since c and b relate to the same d-axis flux path. ψmago is given from Kv, as in the simplified calculation.

Figure 9:
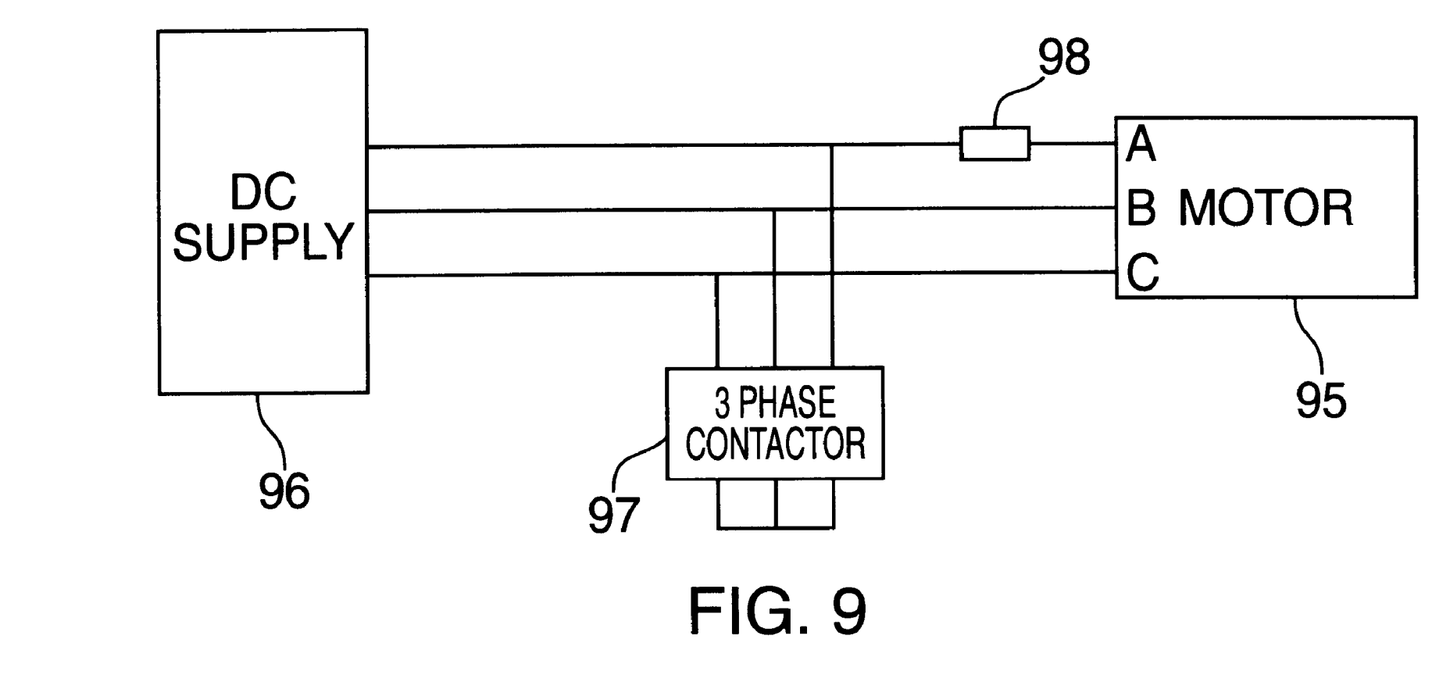
FIG. 9 is a functional block diagram of a circuit that may be used to measure q-axis and d-axis motor inductances at various stator currents.

FIG. 9 depicts a circuit that may be used to measure q-axis and d-axis inductances at various stator currents. In the circuit, each phase winding (A, B and C) of a three phase motor 95 is coupled to a DC power supply 96. A three phase contactor 97 is coupled between the motor and power supply for the purpose of short-circuiting the three phase lines. A shunt resistor 98 is connected in the phase A line of the motor for the purpose of facilitating oscilloscope measurement. The circuit may be used to implement the following method of measuring Lq and Ld.

The q-axis inductance, Lq, is measured first. To measure the q-axis inductance, the positive terminal of the DC power supply is connected to the phase B winding of the motor and the negative terminal of the DC power supply is connected to the phase C winding of the motor. The A winding of the motor is allowed to float, and the motor shaft is allowed to rotate freely. After the foregoing preparations have been made, the DC power supply is turned on and the output voltage is increased until the output current reaches about ¼ of the rated stator current. The motor shaft should be allowed to settle into a stable position, and once stabilized, the shaft should be locked. Next, the phase A winding is connected to the positive terminal of the DC power supply, and both the B and C windings are connected to the negative terminal of the DC power supply. The DC supply voltage is increased until the DC supply output current reaches a desired level. Preferably the supply voltage is increased to a level at which the A winding current is 1.41 times the rated stator current (rms). When the DC output current reaches the desired level, the three phase contactor is activated and the decay time of the output current is measured. The decay time is defined as the amount of time it takes the output current to change from the desired level to 37% of the desired level. Finally, Lq is calculated by multiplying the decay time by the phase resistance of the motor. Of course, the closure of the contactor must be free of chatter to obtain an accurate value for the decay time.

To measure the d-axis inductance, Ld, the contactor is deactivated and the shaft is unlocked. Next, the phase A winding current is set to ¼ of the rated stator current, and the motor shaft is allowed to settle into a stable position and then locked. At this point the Ld measurement proceeds in the same manner as the Lq measurement. That is, the A winding is connected to the positive terminal of the DC power supply, and both the B and C windings are connected to the negative terminal of the DC power supply. The DC supply voltage is increased until the DC supply output current reaches a desired level. Preferably the supply voltage is increased to a level at which the A winding current is 1.41 times the rated stator current (rms). When the DC output current reaches the desired level, the three phase contactor is activated to measure the decay time of the output current. Finally, Ld is calculated by multiplying the decay time by the phase resistance of the motor.

Thus, the required motor parameters and drive parameters are measured and set up during initialization and then used to calculate the advance angle according to the dynamic parameters of rotor speed and stator current while the motor is in operation.

Figures 10A, 10B:
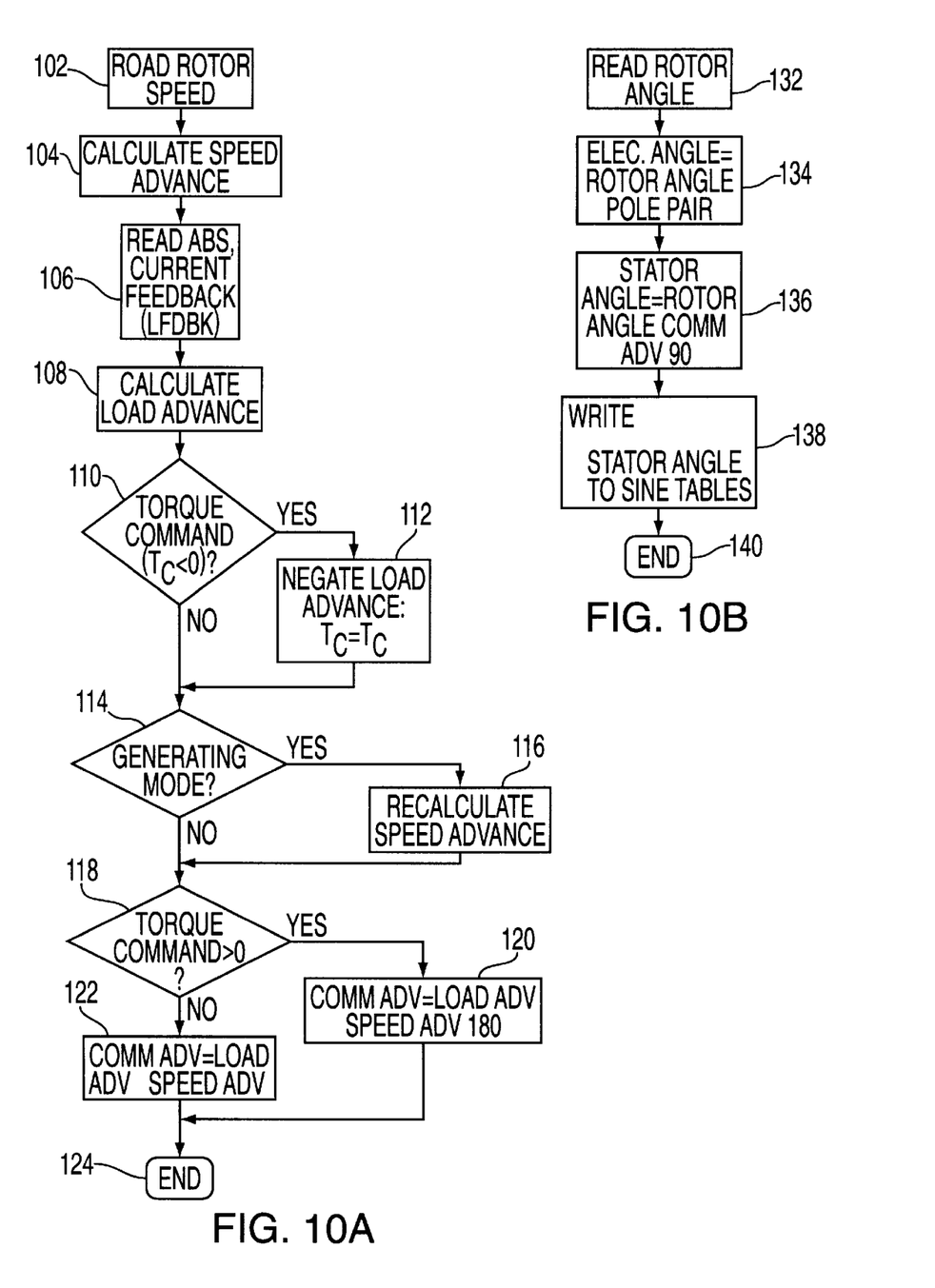
FIG. 10A is a flowchart showing the steps taken in calculating the angle advance in accordance with a preferred embodiment of the present invention.
FIG. 10B is a flowchart showing the steps taken in applying an angle advance.

An exemplary angle advance calculation procedure and an exemplary angle advance application procedure are shown in the flowcharts of FIGS. 10A and 10B, respectively. The examples are meant to be used with the embodiment shown in FIGS. 1, 2 and 3.

FIG. 10A is a flowchart that shows the steps taken to calculate the angle advance. FIG. 10B shows the steps taken in applying the angle advance calculated according to FIG. 10A using the look-up table approach. In this particular procedure the calculation of the angle advance is performed once every "servo interrupt" period, or 500 usec, while the angle advance is applied once every "commutation interrupt" period, or 125 usec.

Referring to FIG. 10A, the first step in calculating the angle advance is to read the rotor speed (step 102). Next, the speed advance is calculated, assuming that the motor is in motoring mode (step 104), e.g., through a look up table of speed vs speed advance for motoring mode such as shown in FIG. 7B. The third step is to read the absolute value of the current feedback that is sensed by current sensor 71 of FIG. 3 (step 106). The fourth step is to calculate the load advance (step 108), e.g., through a look up table of current vs load advance such as shown in FIG. 7A. Next, the value of the torque command is compared to zero (step 110). If the torque command is less than zero, the sign of the torque command is inverted (step 112). If the torque command is greater than or equal to zero, step 112 is bypassed. The net effect of steps 110 and 112 is to determine the absolute value of the torque command.

After taking the absolute value of the torque command, a determination of the motor's operating mode is made (step 114). If the motor is in the generating mode, then the speed advance must be recalculated (step 116) since the initial speed advance calculation assumed that the motor was in the motoring mode. If the motor is indeed in the motoring mode, then step 116 is bypassed. In the next step the torque command is again compared to zero (step 118). If the torque command is greater than zero, the angle advance is computed by adding the load advance, speed advance, and 180° (step 120). If the torque command is less than or equal to zero, the angle advance is computed by adding the speed advance and load advance (step 122). At this point, calculation of the angle advance is complete (step 124).

FIG. 10B shows the steps taken in applying the angle advance. First, the present rotor angle is read (step 132). Second, the electrical angle is set equal to rotor angle times the pole pair (step 134). Third, the stator angle is set equal to rotor angle plus the angle advance plus 90°. Finally, the stator angle is written to the sine tables 48 and 52 (FIG. 2) for conversion to an amplitude value (step 138). At this point the application of the angle advance is complete (step 140).

In an adaptive operation the motor parameters and drive parameters are established in an initializing step. Equation (15) is calculated in step 104 and equation (10) is calculated in step 108. Otherwise, the flow diagrams in FIGS. 10A and 10B are the same.

Several embodiments for the invention have been described in detail. However, it should be obvious that there are many further variations evident to persons skilled in the art. For example, the motor may be a moving permanent magnet linear motor rather than a rotary motor. Also, many components described in hardware could be in software operating in a microprocessor. The invention is more particularly defined in the appended claims.

We claim:

1. A controller for a brushless motor including a permanent magnet rotor and a stator winding, comprising:
   a) means for generating a position feedback signal indicative of the rotor position relative to the stator;
   b) means for generating a velocity feedback signal indicative of the rotor velocity;
   c) means for providing a stator current feedback signal indicative of the current supplied to the stator winding;
   d) means for computing a maximum torque angle advance according to measured motor and controller parameters as a function of said velocity feedback signal and said stator current feedback signal; and
   e) means for generating a sinusoidal excitation for the stator winding having a frequency according to said velocity feedback and a phase according to said maximum torque angle advance.

2. A controller according to claim 1 wherein said motor parameters include the number of poles, the back EMF constant, and the stator inductance for the motor.

3. A controller according to claims 1 or 2 wherein said controller parameters include the controller bandpass, the available link voltage, and the loop time delay.

4. A controller according to claim 1 wherein said permanent magnets are embedded in said rotor and wherein said maximum torque angle advance varies as a function of rotor velocity and stator current.

5. A controller according to claim 1 wherein said permanent magnets are surface mounted in said rotor and wherein said maximum torque advance angle varies as a function of rotor velocity.

6. A controller according to claim 1, wherein said means for computing determines a speed advance angle according to said velocity feedback signal, determines a load advance angle according to said stator current feedback signal, and computes said maximum torque angle according to said speed advance angle and said load advance angle.

7. A controller according to claim 1, farther comprising means for controlling the magnitude of said sinusoidal excitation of said means for generating as a function of rotor speed.

8. A method of controlling a brushless motor including a permanent magnet rotor and a stator winding, comprising:
   a) generating a position feedback signal indicative of the rotor position relative to the stator;
   b) generating a velocity feedback signal indicative of the rotor velocity;
   c) providing a stator current feedback signal indicative of the current supplied to the stator winding;
   d) computing a maximum torque angle advance according to measured motor and controller parameters as a function of said velocity feedback signal and said stator current feedback signal; and
   e) generating a sinusoidal excitation for the stator winding having a frequency according to said velocity feedback and a phase according to said maximum torque angle advance.

9. The method according to claim 8 wherein said motor parameters include the number of poles, the back EMF constant, and the stator inductance for the motor.

10. The method according to claims 8 or 9 wherein said controller parameters include the controller bandpass, the available link voltage, and the loop time delay.

11. The method according to claim 8 wherein said permanent magnets are embedded in said rotor and wherein said maximum torque angle advance varies as a function of rotor velocity and stator current.

12. The method according to claim 8 wherein said permanent magnets are surface mounted in said rotor and wherein said maximum torque advance angle varies as a function of rotor velocity.

13. The method according to claim 8, wherein the computing determines a speed advance angle according to said velocity feedback signal, determines a load advance angle according to said stator current feedback signal, and computes said maximum torque angle according to said speed advance angle and said load advance angle.

14. The method according to claim 8, further comprising controlling the magnitude of said sinusoidal excitation as a function of rotor speed.

15. A method of controlling a brushless motor including a permanent magnet rotor and a stator winding, comprising:
   a) generating a position feedback signal indicative of the rotor position relative to the stator;
   b) generating a velocity feedback signal indicative of the rotor velocity;
   c) providing a stator current feedback signal indicative of the current supplied to the stator winding;
   d) computing a maximum torque angle advance according to measured motor and controller parameters as a function of said velocity feedback signal; and
   e) generating a sinusoidal excitation for the stator winding having a frequency according to said velocity feedback and a phase according to said maximum torque angle advance.

16. A method of compiling a look-up table providing maximum torque angle advance values for controlling the phase of the sinusoidal excitation for a brushless motor with rotating permanent magnets and a stator winding, comprising:
   a) measuring motor parameters including the number of poles, the back EMF constant, and the stator inductance for the motor;
   b) measuring controller parameters including the controller bandpass, the available link voltage, and the loop time delay;
   c) calculating phase advance values according to said measured parameters as a function of rotor velocity; and
   d) setting the phase of the sinusoidal excitation according to said phase advance values corresponding to the rotor velocity.

17. A method of compiling a look-up table providing maximum torque angle advance values for controlling the phase of the sinusoidal excitation for a brushless motor with rotating permanent magnets and a stator winding comprising:
   a) measuring motor parameters including the number of poles, the back EMF constant, and the stator inductance for the motor;
   b) measuring controller parameters including the controller bandpass, the available link voltage, and the loop time delay;
   c) calculating phase advance values according to said measured parameters as a function of rotor velocity; and
   d) setting the phase of the sinusoidal excitation according to said phase advance values corresponding to the rotor velocity and stator current.

18. A controller for a brushless motor including a moving permanent magnet and a stator winding, comprising:
   a) means for generating a position feedback signal indicative of the permanent magnet position relative to the stator;
   b) means for generating a velocity feedback signal indicative of the permanent magnet velocity;
   c) means for providing a stator current feedback signal indicative of the current supplied to the stator winding;
   d) means for computing a maximum torque angle advance according to measured motor and controller parameters as a function of said velocity feedback signal and said stator current feedback signal; and
   e) means for generating a sinusoidal excitation for the stator winding having a frequency according to said velocity feedback and a phase according to said maximum torque angle advance.

* * * * *